Jan. 23, 1923.

F. W. SHAW.
STONE GATHERING MACHINE.
FILED MAY 2, 1921.

Witness
James F. FitzGibbon

Inventor
Ford W. Shaw
By Chandler & Chandler
Attorney

Jan. 23, 1923.

F. W. SHAW.
STONE GATHERING MACHINE.
FILED MAY 2, 1921.

Inventor
Ford W. Shaw.

Witness.
James F. Fitz Gibbon

By Chandler Chandler
Attorneys.

Patented Jan. 23, 1923.

1,442,979

UNITED STATES PATENT OFFICE.

FORD W. SHAW, OF LITTLE JEWEL, MONTANA.

STONE-GATHERING MACHINE.

Application filed May 2, 1921. Serial No. 466,253.

*To all whom it may concern:*

Be it known that I, FORD W. SHAW, a citizen of the United States, residing at Little Jewel, in the county of Blaine, State of Montana, have invented certain new and useful Improvements in Stone-Gathering Machines; and I do hereby declare the following to be a full, clear, and exact description of the invention, such as will enable others skilled in the art to which it appertains, to make and use the same.

This invention relates to new and useful improvements in loading devices and particularly to devices for loading stones.

One object of the present invention is to provide a novel and improved device of this character in which a continuously moving set of gathering devices are arranged to scrape up a quantity of stones and elevate them onto a conveyor which deposits them into a receptacle arranged to travel at the side of the rear of the device.

Another object is to provide a novel and improved stone carriage and means for moving the same into stone scraping position, and conveying the same into position to dump the stones into a traveling means for delivery into a receptacle.

Other objects and advantages will be apparent from the following description when taken in connection with the accompanying drawings.

Figure 1:
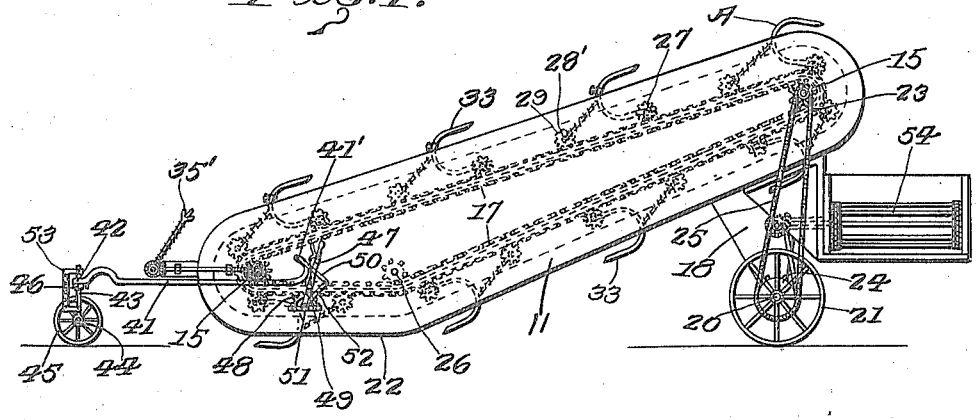
Figure 1 is a side elevation of a stone gathering and loading machine made in accordance with my invention.
Figure 2:
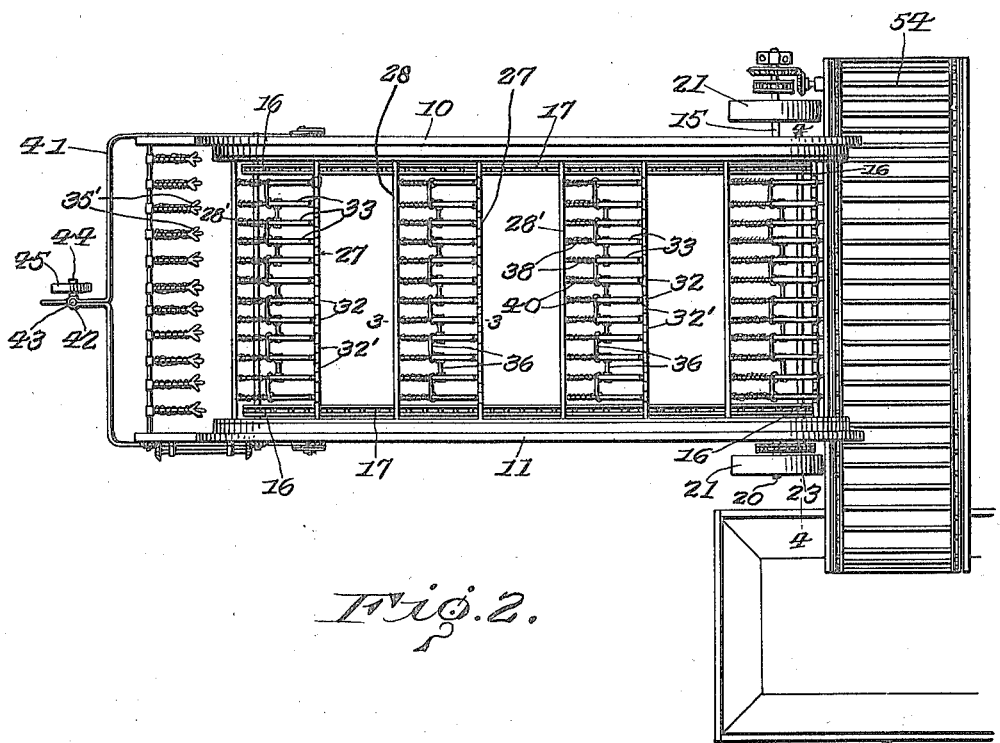
Figure 2 is a top plan view of the same, including the stone receiving receptacle and conveyor therefor.
Figure 3:
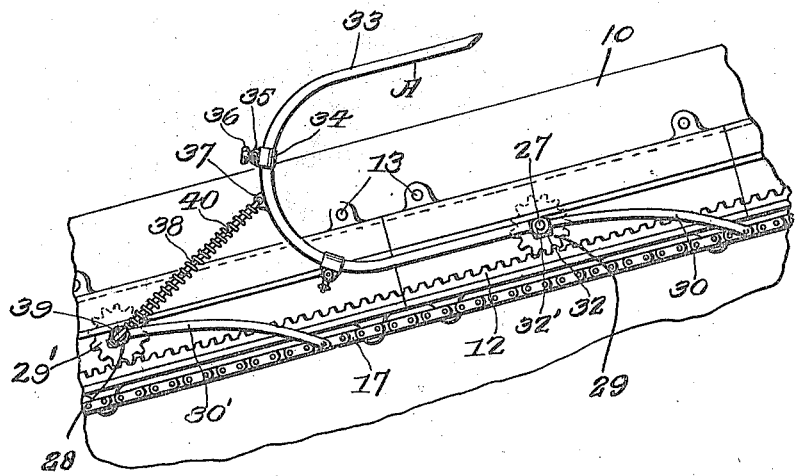
Figure 3 is an enlarged vertical transverse sectional view taken on the line 3—3 of Figure 2, showing the construction of the supporting tracks and the carriage thereon.
Figure 4:
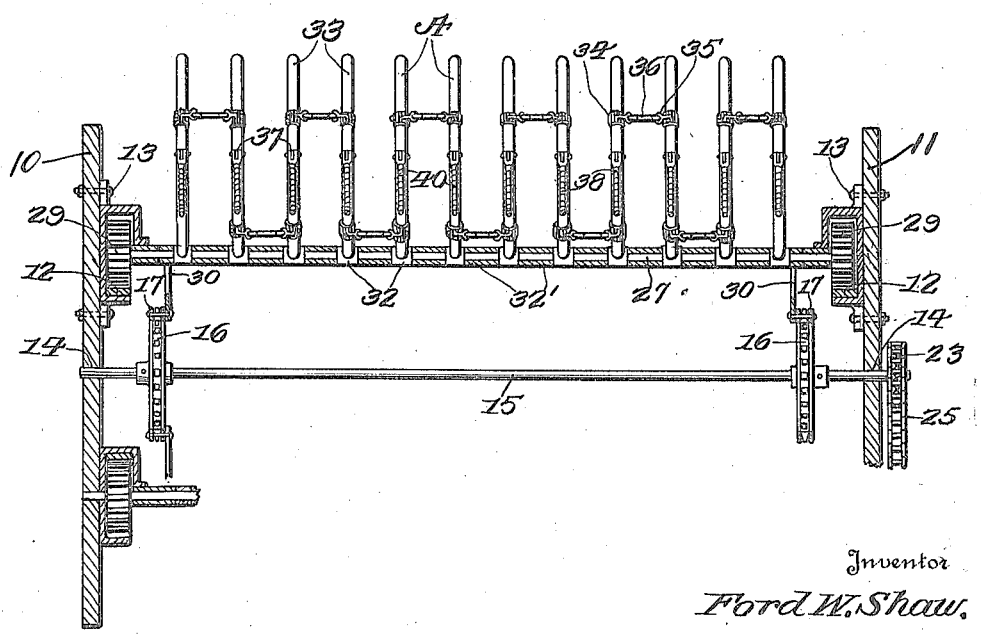
Figure 4 is an enlarged vertical sectional view taken on the line 4—4 of Figure 2, transversely through the axles of the carriage.

Referring particularly to the accompanying drawings, 10 and 11 represent a pair of elongated plates which are disposed in vertical parallel relation to each other. Secured to each plate and extending continuously around its inner wall is an internal rack 12, the same being made up of a plurality of sections bolted to the said plates, by the bolts 13. Each of the plates 10 and 11 is formed at its opposite ends, and concentrically with the curves thereof, with openings 14 through which extend the ends of the drive shafts 15. On these shafts, between the plates, are mounted the large sprocket wheels 16, around which engage the endless chains 17, said chains being disposed adjacent the plates, as clearly seen in the drawing, and especially in the sectional view Figure 3. On one end of each of the plates 10 and 11, there is formed a depending leg 18 having an opening 19 for the reception of the end of the axle 20, on the ends of which axle are mounted the ground engaging wheels 21. The entire structure is inclined toward the opposite end to that on which the wheels 21 are mounted, and said end is formed with horizontal portions 22 which ride on the ground over which the machine is being propelled, the wheels 21 serving to hold the other end of the frame in proper elevated position, as clearly shown.

On one end of one of the shafts 15 there is mounted a sprocket wheel 23 which receives power from a sprocket wheel 24 on one of the wheels 21, by means of the drive chain 25, whereby the chains 17 are driven. Through the sides of the plates 10 and 11, at the point of connection between the inclined portions and horizontal portions thereof, there is disposed a shaft 26 similar to the shaft 15 and with which the chains 17 are engaged.

A number of carriages, each designated as a whole by the letter A, are arranged to travel around on the racks 12, and driven by the chains 17, as will be now described.

Each of the carriages comprises a pair of parallel axles 27 and 28 extending from one side of the device to the other between the plates 10 and 11 and on the end of each axle 27 is rotatably mounted a gear 29 meshing with the racks 12. On each end of the axle 27, inwardly of its gear 29, there is loosely secured a link 30, the other end being loosely connected to one of the drive chains 17 in advance of the shaft, whereby the carriages will be drawn around with the chains, as will be clearly understood. On each end of the axle 28 is also mounted a gear 29', which meshes with the rack 12. The forward axle 27 has a plurality of blocks 32 loosely mounted thereon, and connected to each of the blocks is a hook-shaped tine 33 arranged to travel in parallel relation with the ground, and a short distance thereabove, to permit the tines to project slightly below the plates 10 and 11, to scrape up stones, as will be readily understood.

Connected to the shaft 28, and extending forwardly where they are connected with the chains 17, are the draft links 30'. Between pivotal portions of each pair of tines, and arranged on the shaft 27, are the spacing collars 32', said collars holding the tines at their proper distances apart while permitting the free rocking of the tines on the shaft. Secured around the bight portion of each of the tines 33 is a collar 34, and extending rearwardly from each collar and pivotally connected therewith is an arm 35. Loosely connected to each pair of collars 34, and extending between the adjacent tines, is a link 36. On the bight portion of each tine is a lug 37, and pivotally connected to each lug is a rod 38 which has its rear end slidable through an opening 39 in the shaft 28. Encircling each rod 38 is a coil spring 40 which bears against the lug 37 and the shaft 28. These springs serve as a cushion for the weight of the stones when the carriage is full.

On the forward end of the frame of the machine are mounted the inwardly extending resilient fingers 35' which engage and force the stones into the tines just immediately before the carriage starts in its upward movement on the frame.

Pivotally supported on the outer side of the forward end of each of the plates 10 and 11 is a forwardly extending arm 41, the forward ends of which converge and are joined together, and formed with a vertical eye 42 to receive the angular vertical shaft 43, which shaft is connected to the axle 44 of the ground wheels 45. A collar 46 is arranged on the shaft 43, below the eye, at such a distance as to provide for a slight play, up and down, of the eye on the shaft. On one of the plates, rearwardly of the arm 41, is mounted an operating lever 47 which is pivotally supported in connection with a rack segment 48 for locking engagement with the detent 49 of the lever. The rear end of each arm 41 is turned upwardly and forwardly, as shown at 41', and pivotally connected to each of said curved ends is a rearwardly extending link 50. The shaft 51, on which the operating lever 47 is mounted, extends transversely through both of the plates 10 and 11, and on each end of the shaft is secured an upwardly and rearwardly extending arm 52 which is pivotally connected with one of the links 50. A draft clevis 53 is carried by the vertical shaft 43, for attachment of draft animals or tractor.

When the lever 47 is rocked with the shaft 51 the arms 52 and links 50 rock the arms 41 on their pivots and raise or lower the forward ends of the plates 10 and 11, whereby the scraping tines will be moved into and out of scraping position with respect to the ground.

Mounted on the rear of the machine, and extending transversely thereof is an endless conveyor 54 which is operatively connected with the drive of the wheels 21, and arranged in position to receive the stones from the tines to carry and deliver the stones into a wagon which travels at the side of the machine.

What is claimed is:

1. A stone gathering machine comprising a frame including a pair of endless tracks having racks thereon, sprockets mounted at the ends of the frame and intermediate thereof, chains around said sprockets stone gathering and conveying carriages having pinions engaging with said racks, stone retaining tines on the carriages, and links connecting the carriages with the driving chains which are engaged around said sprockets.

2. A stone gathering machine comprising a frame including a pair of endless tracks having racks thereon, sprockets mounted at the ends of the frame, chains around said sprockets, and a plurality of carriages each including a pair of transverse shafts, pinions on the shafts engaging the racks, stone gathering and holding tines carried by one of the shafts, resilient connections between the tines and the other shaft, and links connected to the shafts and to the chains.

3. A stone gathering machine including a frame, racks on the frame, endless chains supported on the frame, and stone gathering carriages each comprising a pair of transverse parallel shafts, pinions on the ends of the shafts engaging with the racks, a plurality of curved stone gathering tines connected with one of the shafts, links connecting the shafts with the chains, rods and springs connected with the tines and the other shaft, and flexible connections between the tines.

In testimony whereof, I affix my signature, in the presence of two witnesses.

FORD W. SHAW.

Witnesses:
 TESSIE MOSER,
 GUST. FRANZEN.